(12) United States Patent
Paes et al.

(10) Patent No.: US 11,869,534 B2
(45) Date of Patent: Jan. 9, 2024

(54) SMART MICROPHONE-SPEAKER DEVICES, SYSTEMS AND METHODS

(71) Applicant: LOUROE ELECTRONICS, Van Nuys, CA (US)

(72) Inventors: Wayne Anthony Paes, Chatswworth, CA (US); Juan Manuel Alfaro, North Hills, CA (US)

(73) Assignee: Louroe Electronics, Van Nuys, CA (US)

( * ) Notice: Subject to any disclaimer, the term of this patent is extended or adjusted under 35 U.S.C. 154(b) by 0 days.

(21) Appl. No.: 17/848,259

(22) Filed: Jun. 23, 2022

(65) Prior Publication Data

US 2023/0011743 A1    Jan. 12, 2023

Related U.S. Application Data

(60) Provisional application No. 63/219,617, filed on Jul. 8, 2021.

(51) Int. Cl.
*G10L 25/51* (2013.01)
*H04R 1/02* (2006.01)
(Continued)

(52) U.S. Cl.
CPC .............. *G10L 25/51* (2013.01); *G01H 11/00* (2013.01); *G08B 21/18* (2013.01); *H04R 1/023* (2013.01);
(Continued)

(58) Field of Classification Search
CPC ........ G10L 25/51; G01H 11/00; G08B 21/18; H04R 1/023; H04R 1/025; H04R 1/04; H04R 1/08; H04R 3/00; H04R 2420/09
See application file for complete search history.

(56) References Cited

U.S. PATENT DOCUMENTS 10,091,569 B1 * 10/2018 Paes ...................... H04R 1/326
2009/0027498 A1    1/2009 Owen et al.
(Continued)

FOREIGN PATENT DOCUMENTS

JP    2007-228287 A    9/2007
WO    WO-2019/231861 A1    12/2019

OTHER PUBLICATIONS

Noriega-Linares, J.E. & Navarro Ruiz, J.M. (2016). On the Application of the Raspberry Pi as an Advanced Acoustic Sensor Network for Noise Monitoring. Electronics, 5(4), p. 74.
(Continued)

*Primary Examiner* — Andrew L Sniezek
(74) *Attorney, Agent, or Firm* — Foley & Lardner LLP

(57) ABSTRACT

A microphone-speaker device includes a speaker, a microphone configured to capture sound and output an audio data signal and a housing configured to contain the microphone and the speaker. The device also includes an electronic circuit having audio electronics coupled to the speaker, an Ethernet interface configured to connect the electronic circuit for communication with a security system through an Ethernet connection, a power extractor for extracting power from the Ethernet connection for powering the electronic circuit and the microphone, and processing electronics configured to process the audio data signal from the microphone.

19 Claims, 6 Drawing Sheets

(51) Int. Cl.
   *H04R 1/04*    (2006.01)
   *H04R 3/00*    (2006.01)
   *H04R 1/08*    (2006.01)
   *G01H 11/00*   (2006.01)
   *G08B 21/18*   (2006.01)

(52) U.S. Cl.
   CPC ............... *H04R 1/025* (2013.01); *H04R 1/04* (2013.01); *H04R 1/08* (2013.01); *H04R 3/00* (2013.01); *H04R 2420/09* (2013.01)

(56) References Cited

U.S. PATENT DOCUMENTS

| | | | |
|---|---|---|---|
| 2017/0316537 A1* | 11/2017 | Drzymala | ............ G06Q 90/20 |
| 2020/0035261 A1 | 1/2020 | Mitchell et al. | |
| 2021/0091822 A1 | 3/2021 | Alpert et al. | |
| 2021/0211104 A1 | 7/2021 | Kim et al. | |

OTHER PUBLICATIONS

Segura-Garcia, J., Felici-Castell, S., Perez-Solano, J.J., Cobos, M. and Navarro, J.M. (2014). Low-Cost Alternatives for Urban Noise Nuisance Monitoring Using Wireless Sensor Networks. IEEE Sensors Journal, 15(2), pp. 836-844.

* cited by examiner

SMART MICROPHONE-SPEAKER DEVICES, SYSTEMS AND METHODS

CROSS-REFERENCE TO RELATED PATENT APPLICATION

This application claims priority from Provisional application U.S. Application 63/219,617, filed Jul. 8, 2021, incorporated herein by reference in its entirety.

BACKGROUND

The present disclosure relates to a microphone and speaker device that detects sound events and can provide audio output and, in particular examples, to a microphone-speaker device for or in a security system, and a security system that includes one or more of the microphone-speaker devices.

Various microphone devices for security systems have been produced, including the Verifact® A product made by Louroe Electronics. The Verifact® A product is an omnidirectional microphone within a housing that is configured to mount to a wall or ceiling surface. In certain contexts, additional functions and capabilities of a smart microphone-speaker device or system as described herein can be beneficial.

DETAILED DESCRIPTION

Referring to the FIGS. 1-8, generally, systems, apparatuses, and methods described herein relate to a smart microphone and speaker device (microphone-speaker device) configured for analyzing audio data signals to detect certain types of sound events such as but not limited to, a gun-shot, breaking glass, a loud or aggressive voice, a spray can shaking, and the like. The smart microphone-speaker device may be contained in a device housing that is connectable to an Ethernet network. In particular examples, the smart microphone-speaker device can include a microphone, audio analytic electronics, a speaker, and an amplifier and other audio output electronics contained and supported in a single unit or by a single housing, and that is connectable to the Ethernet network through an Ethernet interface (e.g., a single Ethernet connection port).

In other examples, the smart microphone-speaker device is configured in multiple units or housings that electrically connect to each. However, the single-unit or single-housing examples can provide significant advantages in simplifying installation and increasing placement location options. The smart microphone-speaker device may be configured to be mounted to a suitable location such as but not limited to, in or on a ceiling, a wall, or another structure. In certain examples, the smart microphone-speaker device may include additional interfaces (e.g., ports) for connecting to local devices such as but not limited to one or more, cameras, additional external microphones, external speakers, external auxiliary power sources, relays, or the like.

By incorporating the Ethernet connectable microphone device and associated electronics within a single, relatively small housing having an Ethernet connection port, the housing of the smart microphone-speaker device may be readily mounted in any suitable location and position that has Ethernet connection access such as, a specific area or environment for which security or other audio monitoring needs are desired. In further examples, a computerized security system may include or operate with one, two or more smart microphone-speaker devices, each contained within a different respective housing and mounted at a different respective location in or around a facility, relative to other microphone devices connected in or to the system.

Figure 1:
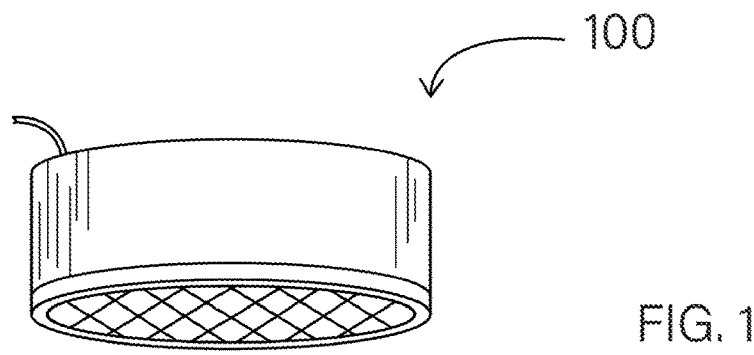
FIG. 1 is a perspective view of a microphone-speaker device according to various implementations described herein.
Figure 2:
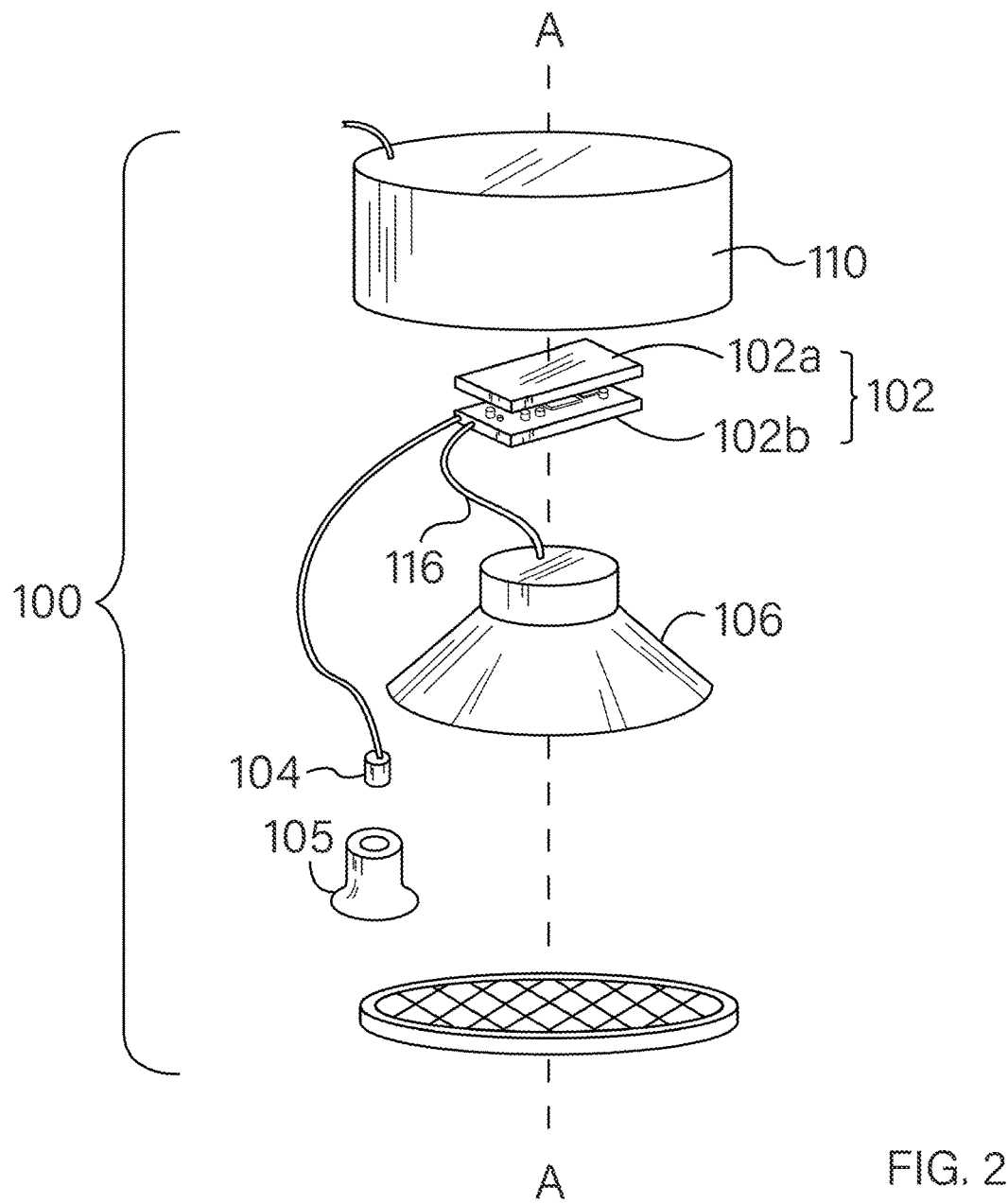
FIG. 2 illustrates a partially-exploded, perspective view of the microphone-speaker device of FIG. 1.

A perspective view of an example smart microphone-speaker device 100 in an assembled state is shown in FIG. 1. A partially exploded view of the smart microphone-speaker device 100 is shown in FIG. 2. Referring to FIG. 2, the smart microphone-speaker device 100 has an electronic system 102, a microphone 104 and a speaker 106. Further examples may include more than one microphone or more than one speaker.

In particular examples, the electronic system 102, the microphone 104 and the speaker 106 are incorporated or attached together, as a single unit, and may be held within a single housing. In certain examples, the housing may include a speaker grill member 108 and a cover member 110 that connect together to enclose an interior volume in which the electronic system 102, the one or more microphones 104 and the one or more speakers 106 are located. One or more connection mechanisms may be provided for securing the speaker grill member 108 and the cover member 110 together such as, but not limited to adhesive, welding, thermal bonding, clamps, screws, bolts, other fasteners or combinations thereof.

The grill member 108 and the cover member 110 may be made of any suitably rigid material or materials such as but not limited to, metal, plastic, ceramic, composite material, combinations thereof, or the like. In some examples, the cover member 110 may include or operate with one or more further brackets, clamps or other fasteners, for mounting the cover member 110 in or on a ceiling, a wall or another structure. In particular examples, the cover member 110 may be mounted in or on a ceiling, a wall, or another structure, with the speaker grill member 108 facing outward and exposed, toward an environment in which audio monitoring is desired.

In some examples, the smart microphone-speaker device 100 also includes a mounting structure 105 on which the microphone 104 is mounted. Examples of microphone mounting structures 105 are described below. In other examples, the mounting structure 105 may be omitted, and the microphone 104 may secure to the speaker grill 108, the cover member 110 or other components of the smart microphone-speaker device 100, directly or through other mounting structures. In particular examples, the microphone 104 is mounted in a manner to receive and capture sound through the speaker grill 108, from an environment in the vicinity of the smart microphone-speaker device 100.

The microphone 104 provides audio signals in response to (and corresponding to) received sound. The electronic system 102 is configured to perform audio analytics (such as described below) on the audio signals provided by the microphone 104. In addition, the electronic system 102 is configured to extract power from an Ethernet connection (such as, but not limited to a Power-Over-Ethernet (POE) connection) or other network communication connection.

The POE or other network communication connection provides electrical power for powering the electronic system and also provides a communication link for connecting the electronic system in communication with one or more further communication systems (e.g., a security system 204 or other system located remote from the smart microphone device 100). In some examples, the smart microphone-speaker device 100 may be entirely powered by the POE connection and a further power source is not required. In other examples, the smart microphone-speaker device 100 includes a power input port or conductor for connection to a further external power source such as, but not limited to an AC power source or an external DC power source. In those or other examples, the smart microphone-speaker device 100 may include an on-board power source such as, a battery. In yet other examples, the smart microphone-speaker device 100 includes multiple power sources including any combination of the above-mentioned power sources.

In some examples, the electronic system 102 includes a first circuit board 102a (or a mother board) having components for providing audio analytics on audio signals from the microphone 104, and a second circuit board 102b (or a daughter board) having electronics for providing an Ethernet connection and handshake (or another network connection) and providing power extraction from the Ethernet (or other network) connection to power the electronic system 102. In particular examples, the electronic system 102 may include a motherboard 102a and a daughterboard 102b configuration with an Ethernet interface protocol, such as described in the Applicant's U.S. Pat. No. 10,091,569, which is incorporated herein by reference, in its entirety. While an example of a motherboard 102a and daughterboard 102b configuration is shown in the drawings and can provide advantages as described herein, other examples may include other configurations for the electronic system 102 including, but not limited to a single circuit board, more than two circuit boards, individual components electrically coupled in combination with circuit boards, or individual components electrically coupled without circuit boards.

The motherboard 102a and the daughterboard 102b may be separate (e.g., separate circuit boards that are supported within the device housing). The motherboard 102a may be a commercially available processor circuit board in some examples. By employing a processor motherboard 102a that is separate from the daughterboard 102b, a commercially available processor circuit board may be employed as or for the motherboard, to reduce cost or manufacturing complexity (or both) of the microphone-speaker device 100. In other arrangements, the motherboard 102a may be a customized or partially customized circuit configured for the smart microphone-speaker device 100 or similar devices.

The daughterboard 102b may provide Ethernet connection capabilities (including extraction of data and power from an Ethernet connection) for connecting the motherboard 102a to an Ethernet network connection. Accordingly, the motherboard 102a need not, itself, include Ethernet data and power extraction capabilities (and, thus, may be a commercially available processor board). In addition, the daughterboard 102b may provide the motherboard 102a with audio data signals corresponding to audio sound captured in a local vicinity of the microphone 106.

Figure 3:
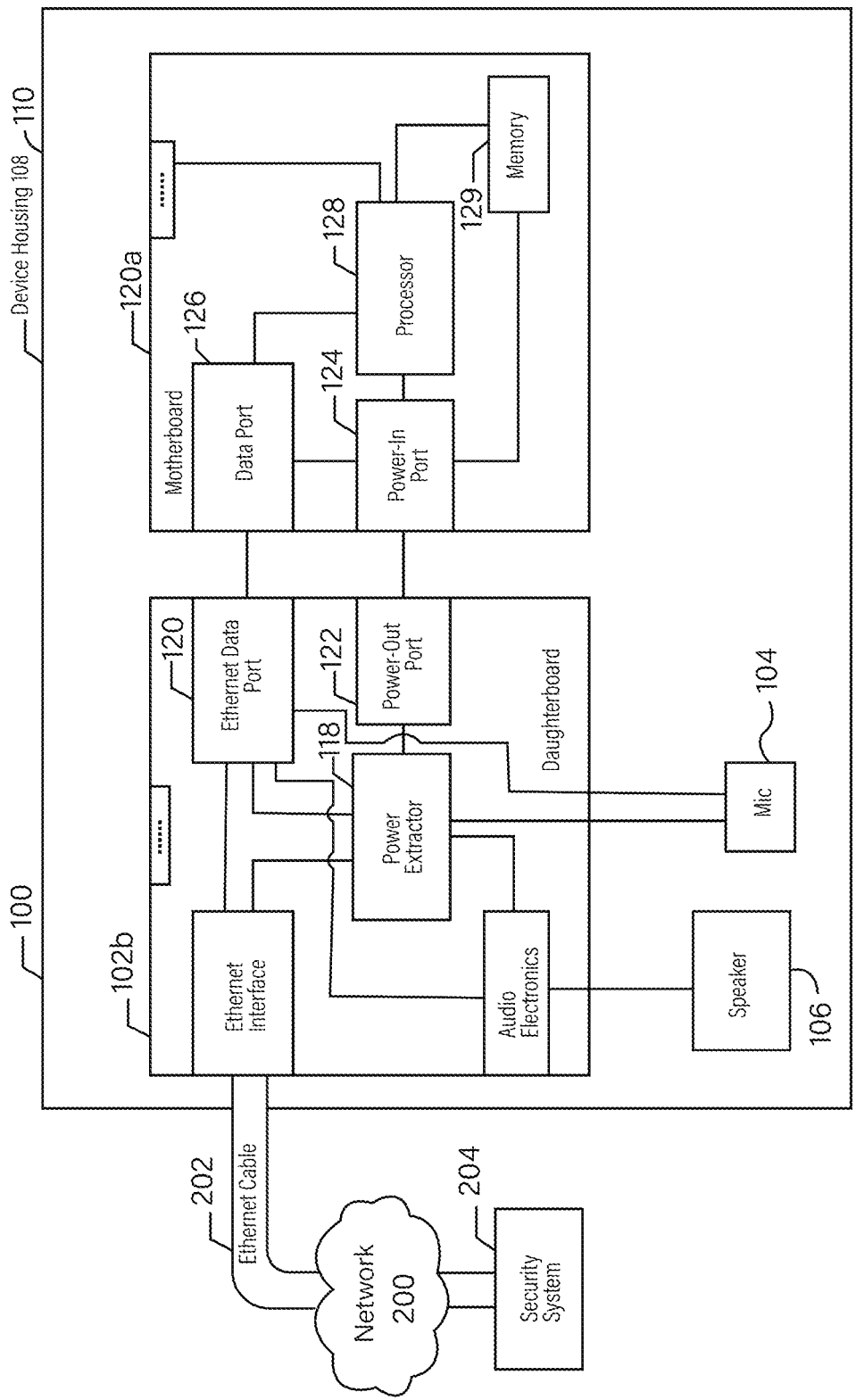
FIG. 3 illustrates a generalized schematic diagram of example electronics and a system connection of the microphone-speaker device of FIG. 1.

A schematic diagram of an example of the smart microphone-speaker device 100 having motherboard 102a, a daughterboard 102b, a microphone 104 and a speaker 106 is shown in FIG. 3. In FIG. 3, the smart microphone-speaker device 100 is shown as connected to a network 200, through an Ethernet cable (or other network link) 202, for communication with other devices on the network 200 such as, but not limited to the security system 204.

The daughterboard 102b may include an Ethernet interface 112 (or other network interface) configured to connect to the Ethernet cable 202 (or other network connection link). An example of the Ethernet interface 112 may be an Ethernet port, jack, or socket. In some examples, the network 200 may be a Local Area Network (LAN), Metropolitan Area Network (MAN), the Internet or other Wide Area Network (WAN), or another suitable network connecting the microphone-speaker device 100 and a security system 204. In some arrangements, the Ethernet cable 202 may connect to a modem or a router, which in turn connects to the network 200. In other arrangements, the Ethernet cable 202 may be directly connected to the security system 204. In some examples, the Ethernet interface 112 may include suitable hardware, firmware, and software used for communicating via the network 200. While a wired connection (e.g., via the Ethernet cable 202) is shown, other examples may include wireless connections to the network 200.

The daughterboard 102b further includes audio output electronics 114 configured to receive audio signals (voice or other audio signals) from the Ethernet connection through the interface 112 (or other network connection) and provide the signals to the speaker 106 for audio output. The audio output electronics 114 may include an audio amplifier for amplifying the audio signals to the speaker 106. In some examples, the audio output electronics 114 may include processing electronics for processing the audio signal, or sound generating electronics for producing sound signals such as, but not limited to electronically generated siren, alarm or warning signals for output by the speaker 106. In the example in FIG. 3, the audio electronics 114 are electrically connected to the speaker 106, through electrical conductors and an audio output port 115 on or in the daughter board, and through further electrical conductors or wires 116 connected between the daughterboard and the speaker 106. In other examples, the audio output electronics 114 may be provided on the motherboard 102a or in other suitable electronic configurations.

The daughterboard 102b may include a power extractor 118 configured to extract power from signals received through the Ethernet cable 202, through the Ethernet interface 112. The power extractor 118 may provide power output signals to components of the daughterboard 102b and the motherboard 102a. For example, the power extractor 118 may be operatively coupled (e.g., via one or more conductors, wires, conductive traces, or the like) to provide power to one or more of the Ethernet interface 112, the audio electronics 114, an Ethernet data port 120 or another suitable component mounted on or directly/indirectly coupled to the daughterboard 102b. In addition, the power extractor 118 may be operatively coupled (e.g., via a conductor, a wire, a conductive trace, or the like) to provide power to the microphone 104.

Alternatively, one or more of the Ethernet interface 112, the audio electronics 114, the Ethernet data port 120, the microphone 104, can be powered independently from an external power source different from the power extractor 118. In addition, the power extractor 118 may be operatively coupled (e.g., via a conductor, a wire, a conductive trace, or the like) to a power-out port 122 on the daughterboard 102b, which is operatively coupled to a power-in port 124 of the motherboard 102a, via a suitable wired or wireless connection. The power-in port 124 of the motherboard 102a may power the motherboard 102a and components mounted on or directly/indirectly coupled (e.g., via a conductor, a wire, a conductive trace, or the like) to the motherboard 102a.

In some examples, the Ethernet interface 112 may communicate Ethernet signals (e.g. data signals) to and from the motherboard 102a. For instance, the Ethernet interface 112 may be operatively coupled (e.g., via a conductor, a wire, a conductive trace, or the like) to the Ethernet data port 120. An example of the Ethernet data port 120 may be an Ethernet port, jack, or socket. In some examples, the Ethernet data port 120 may be operatively coupled to the data port 126 on the motherboard 102a via an Ethernet cable or another suitable connection (e.g., a wire, conductive trace, or the like).

The data port 126 on the motherboard 102a may be operatively coupled (e.g., via a conductor, a wire, a conductive trace, or the like) to a processor 128 on the motherboard 102a. The processor 128 may include or operate with at least one electronic memory device 129 for storing data or programing software (or both) that the processor 128 may use to perform functions described herein.

According to particular examples, the processor 128 is configured to receive audio signals from the microphone 104 (through the Ethernet data port 120 and the motherboard data port 126) and provide audio analytics on the audio signals. The processor 128 may send or stream the analytic results to the data port 126 on the motherboard 102a, which may relay the analytic results to the Ethernet data port 120 on the daughterboard 110. The Ethernet data port 120 may convey the analytic results to the Ethernet interface 112 such that the Ethernet interface 112 may send or stream the analytic results and the audio data signals (based on which the analytic results are determined) together to the security system 204 via the network 200.

In certain examples, the audio data signals may be assigned timestamps and/or sequence numbers by the daughterboard 102b (e.g., by a suitable processing unit (not shown) mounted on the daughterboard or by the microphone 104) as the audio data signals are generated by the microphone 104 based on the captured sound. In other examples, the audio data signals may be assigned timestamps and/or sequence numbers by the processor 128 on the motherboard 102a. In response to the detection of a certain sound event, the timestamp(s) and/or sequence number(s) that correspond to the relevant portions of the audio data signals that are associated with the detected sound event may be recorded. In addition, the audio data signals, the timestamp(s) and/or the sequence number(s) may be sent with analytic results to the daughterboard 102a to be relayed to the security system 204 (or other device on the network 200). Thus, in some arrangements, the daughterboard 102a may send to the security system 204 (or other network device) the audio data signals, as well as the analytic results, and the timestamps and/or sequence numbers that indicate mapping or correspondence between the audio data signals and analytic results.

In some examples, an audio enhancement circuitry (not shown) such as but not limited to, a noise or echo cancelling circuitry, and the like, may be provided on the daughterboard 102b for enhancement of the audio data signals outputted by the microphone 104. In certain examples, the audio enhancement circuitry (not shown) may be configured to cancel signals produced from sound output by the speaker 106, for example, to avoid feedback through the microphone. In other examples, an audio enhancement circuitry (not shown) such as but not limited to, a noise cancelling, echo cancelling or speaker sound cancelling circuitry, and the like, may be provided between the Ethernet data port 120 on the daughterboard 102b and the data port 126 on the motherboard 102a, or on the motherboard 102a, for enhancement of the audio data signals passed from the Ethernet data port 120.

In particular examples, the processor 128 on the motherboard 102a is configured to include analytics capabilities for analyzing audio signals in each of multiple different frequency ranges, to expand the detection range over more frequencies, and to enhance the detection capabilities relative to analyzing audio signals in a single the frequency ranges. In particular examples, the analytics capabilities of the processor 128 includes detecting audio events (and triggering in response to detected audio events) within each frequency range based on different triggering criteria for each different frequency range. Alternatively or in addition, the processor 128 is configured to include analytics capabilities for identifying triggering events based on defined groups or types of sounds and different criteria associated with each different group or type of sounds.

The processor 128 may be configured to analyze audio signals provided by the microphone 104 during discrete sampling periods, or continuously, or combinations thereof. In certain examples, the analysis includes analyzing a defined characteristic of the audio signal in each of a plurality of different frequency ranges. In particular examples, the defined characteristic is the amplitude of the audio signal. In other examples, the defined characteristic may be another characteristic of the audio signal. In particular examples, the same defined characteristic is analyzed in each of the plurality of frequency ranges, but is compared to a different threshold for each respective frequency range. In other examples, a different defined characteristic is analyzed for each different respective frequency range.

In certain examples, the signal analysis may employ one or more process or algorithm for analyzing and identifying certain patterns or repetitive patterns of frequency and amplitude, to detect certain acoustic events. In particular examples, one or more different analysis thresholds or other criteria (for detecting different acoustic events) may be applied for each different frequency range of the plurality of frequency ranges. In some examples, the processor 128 may be configured with artificial intelligence or training routines that allow the system 100 to adapt to the normal background noise in a particular environment or to recognize certain types of acoustic events (or both). Some examples of acoustic events that the processor 128 may be configured to recognize include, but are not limited to: one or more spoken keywords or phrases, alarm tones, breaking materials of a particular type used in a product (e.g., to detect defects in automated product manufacturing or packaging systems), broken glass (such as windows or bottles indicating a security event), drones or unmanned aircraft, and gunshots or explosions.

Each of FIGS. 4-7 shows a schematic diagram shows the frequency vs. amplitude characteristics of a representation of an audio signal 300 received in a sampling period (or during continuous monitoring). The horizontal axis of the diagrams represents the frequency in kilohertz (kHz), while the vertical axis of the diagrams represents the amplitude (in decibels) of the audio signal. In the example of FIGS. 4-7, the horizontal axis is divided into three frequency ranges $R_1$, $R_2$ and $R_3$. The vertical axis also shows three amplitude threshold values $T_1$, $T_2$ and $T_3$. In the example of FIGS. 4-7, the threshold value $T_1$ is associated with a first frequency range $R_1$ (such as, but not limited to the range of 0 to 5 kHz), the threshold value $T_2$ is associated with a second frequency range $R_2$ (such as, but not limited to the range of above 5 kHz to 10 kHz), and the threshold value $T_3$ is associated with a third frequency range $R_3$ (such as, but not limited to the range of above 10 kHz to 15 kHz).

Figure 4:
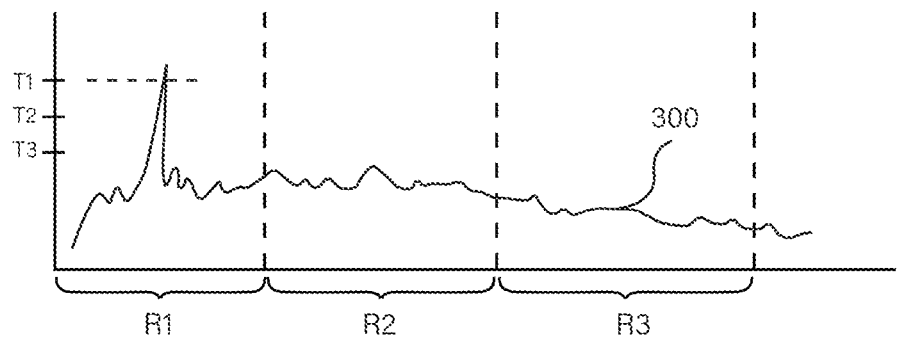
FIGS. 4-7 are generalized graphs of amplitude versus frequency of example representations of audio signals.

In the example in FIG. 4, the amplitude of the audio signal 300 exceeds the first amplitude threshold $T_1$ during the first frequency range $R_1$, but does not exceed the second amplitude threshold $T_2$ during the second frequency range $R_2$, and does not exceed the third amplitude threshold $T_3$ during the third frequency range $R_3$. In the example in FIG. 4, the processor 128 determines a first triggering event has occurred, in response to the amplitude of the audio signal 300 having exceeded the first amplitude threshold $T_1$ during the first frequency range $R_1$.

Figure 5:
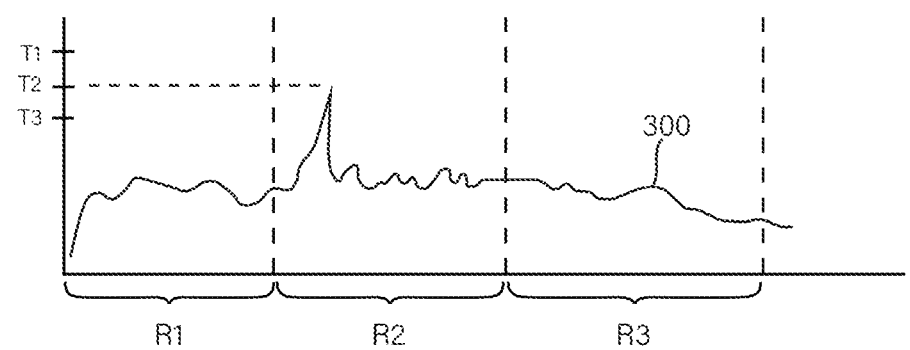

In the example in FIG. 5, the amplitude of the audio signal 300 exceeds the second amplitude threshold $T_2$ during the second frequency range $R_2$, but does not exceed the first amplitude threshold $T_1$ during the first frequency range $R_1$, and does not exceed the third amplitude threshold $T_3$ during the third frequency range $R_3$. In the example in FIG. 5, the processor 128 determines a second triggering event has occurred, in response to the amplitude of the audio signal 300 having exceeded the second amplitude threshold $T_2$ during the second frequency range $R_2$.

Figure 6:
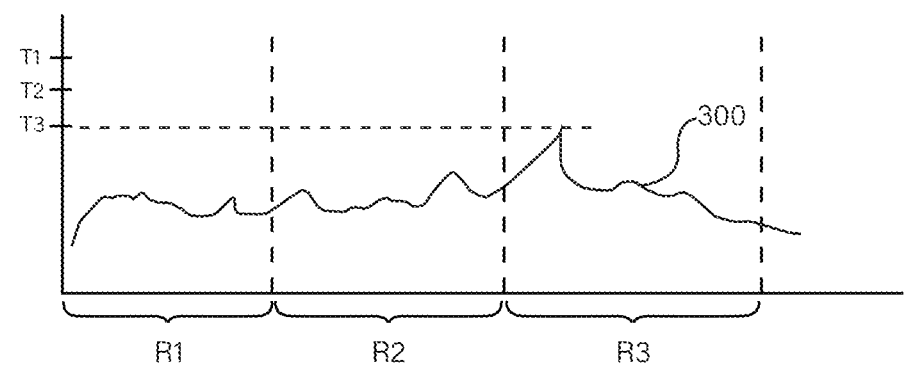
Figure 7:
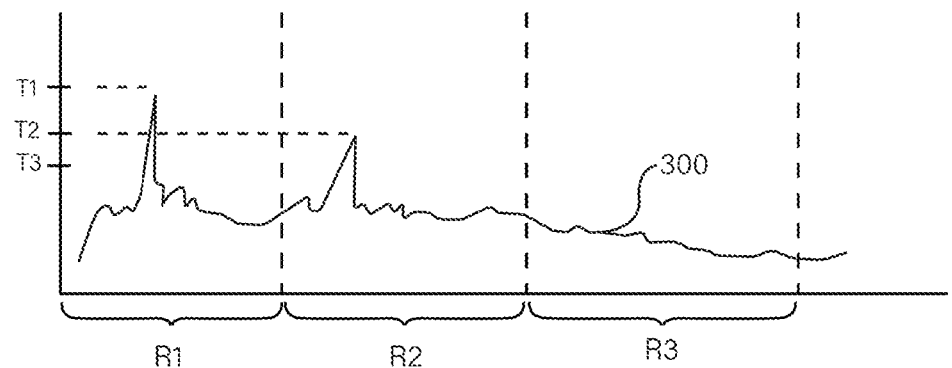

In the example in FIG. 6, the amplitude of the audio signal 300 exceeds the third amplitude threshold $T_3$ during the third frequency range $R_3$, but does not exceed the first amplitude threshold $T_1$ during the first frequency range $R_1$, and does not exceed the second amplitude threshold $T_2$ during the second frequency range $R_2$. In the example in FIG. 6, the processor 128 determines a third triggering event has occurred, in response to the amplitude of the audio signal 300 having exceeded the third amplitude threshold $T_3$ during the third frequency range $R_3$.

In other examples in which the audio signal 300 exceeds more than one of the thresholds $T_1$, $T_2$, and $T_3$ in their associated frequency ranges, the processor 128 may be configured to determine more than one of the triggering events. For example, in FIG. 7, the amplitude of the audio signal 300 exceeds the first amplitude threshold $T_1$ during the first frequency range $R_1$, and also exceeds the second amplitude threshold $T_2$ during the second frequency range $R_2$, but does not exceed the third amplitude threshold $T_3$ during the third frequency range $R_3$. In the example in FIG. 7, the processor 128 determines a first triggering event and a second triggering event has occurred.

Upon determining one or more triggering events, the processor may communicate an associated one or more triggering signals to the security system 204 (or other network device), e.g., through the data port 126, the Ethernet data port 120, the interface 112 and the network 200. In particular examples, the processor 128 may also send the audio signals (or data representing the audio signals) to the security system 204 (or other network device). Alternatively or in addition, the processing may be performed at the security system 204 (or other network device) instead of or in addition to the processor 128.

In certain examples of the processing, a different (identifiably different) triggering signal is associated with each of the thresholds $T_1$, $T_2$, and $T_3$ in their associated frequency ranges. Accordingly, the different triggering signals can represent different triggering events, and can be interpreted by the security system 204 (or other network device) as being associated with different respective triggering events. For example, a triggering signal provided by the processor 128 (or the security system 204 or other network device) in response to the amplitude of the audio signal 300 exceeding the first amplitude threshold $T_1$ during the first frequency range $R_1$ (i.e., a first triggering signal) may be interpreted as indicating a possible male yell or scream, severe weather, earthquake, ship or train horn, or other definable sound event within that frequency range. A different triggering signal provided in response to the amplitude of the audio signal 300 exceeding the second amplitude threshold $T_2$ during the second frequency range $R_2$ (i.e., a second triggering signal) may be interpreted as indicating a possible female or child yell or scream, breaking glass, large caliber gunfire, automobile horn, certain alarm or siren, or other definable sound event within that frequency range. Yet a different triggering signal provided in response to the amplitude of the audio signal 300 exceeding the third amplitude threshold $T_3$ during the third frequency range $R_3$ (i.e., a third triggering signal) may be interpreted as indicating a possible explosion, small caliber gunfire, certain alarms or sirens, or other definable sound event within that frequency range.

In particular examples, the processor 128 (or the security system 204) may be configured to provide a response based on the triggering event determined by (or triggering signal received from) the processor 128, from among the first, second and third triggering signals. Thus, a different response may be provided for each different triggering signal. A first triggering signal representing a possible male human scream may cause the processor 128 or the security system 204 (or personnel associated with the security system 204) to send a signal or other message to notify or send security personnel trained for human de-escalation techniques, medical personnel to a site associated with the location of the device 100. A second triggering signal representing a possible breaking glass may cause the processor 128 or the security system 204 (or personnel associated with the security system 204) to send a signal or other message to notify or send security personnel trained or armed for addressing possible break-ins to a site associated with the location of the device 100. A third triggering signal representing a possible gun shot or explosion may cause the processor 128 or the security system 204 (or personnel associated with the security system 204) to send a signal or other message to notify or send security personnel trained for armed response, medical personnel, or fire response personnel to a site associated with the location of the device 100. In other examples, other types of responses may be associated with the above-noted or other triggering events determined by the processor 128 from the audio signal 300.

Figure 8:
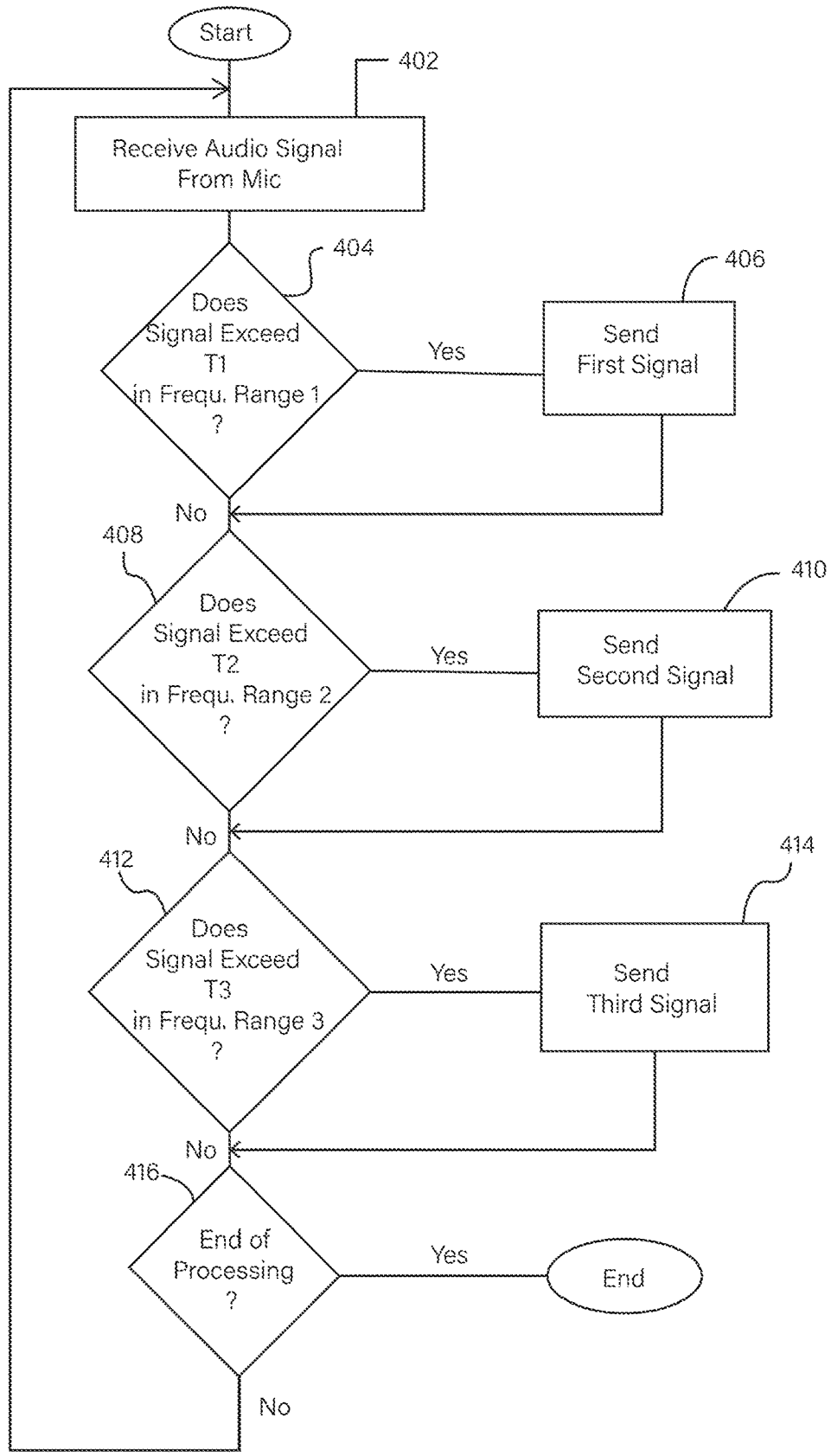
FIG. 8 is a flow chart of a generalized process carried out by the microphone-speaker device of FIG. 1.

A flow chart representing a process flow according to an example of the processing is shown in FIG. 8. With reference to FIG. 8, once the processing is started, an audio signal is received (at 402) from the microphone 104. At 404, a determination is made regarding whether the amplitude of the audio signal received (or being received) exceeds the first threshold $T_1$ in a first frequency range $R_1$. If the processing determines that the threshold $T_1$ has been exceeded (Yes at 404), then a first signal is sent at 406, and the processing proceeds to the next determination 408. Also, if the processing determines that the threshold $T_1$ has not been exceeded (No at 404), then the processing proceeds to that same next determination 408.

At 408, a determination is made regarding whether the amplitude of the audio signal received (or being received) exceeds the second threshold $T_2$ in the second frequency range $R_2$. If the processing determines that the threshold $T_2$ has been exceeded (Yes at 408), then a second signal is sent at 410, and the processing proceeds to the next determination 412. Also, if the processing determines that the threshold $T_2$ has not been exceeded (No at 408), then the processing proceeds to that same next determination 412.

At 412, a determination is made regarding whether the amplitude of the audio signal received (or being received) exceeds the third threshold $T_3$ in the third frequency range $R_3$. If the processing determines that the threshold $T_3$ has been exceeded (Yes at 412), then a third signal is sent at 414, and the processing proceeds to the next determination 416. Also, if the processing determines that the threshold $T_3$ has not been exceeded (No at 412), then the processing proceeds to that same next determination 416.

At 416, a determination is made regarding whether the audio analytics processing should continue. If the audio analytics processing is completed (Yes at 416), e.g., due to the expiration of a monitoring period, shutting off of the security system, or other reason, then the audio analytics processing ends. If the audio analytics processing is to continue (No at 416), then the processing returns to 402, discussed above. In particular examples, the processing may continue with a streamed audio signal from the microphone, until the processing is ended (Yes at 416).

While the example in FIGS. 4-8 include three defined frequency ranges in the processing of the audio signal, other examples may include no more than two frequency ranges, or may include more than three frequency ranges. Also, while the example in FIGS. 4-8 includes one threshold value $T_1$, $T_2$ or $T_3$ for each defined frequency range in the processing of the audio signal, other examples may include more than one threshold value for one or more (or each) of the defined frequency ranges, where the audio signal exceeding each different threshold in a given defined frequency range may trigger different respective triggering signal (for a different respective responsive action).

In particular examples, as shown in FIGS. 4-7, the threshold values $T_1$, $T_2$ and $T_3$ may be different from each other, such that a different threshold is applied to each different frequency range. In other examples, two or more (or all) of the threshold values may be the same for the multiple different frequency ranges. For example, the processor may be configured to apply the same threshold value to each of the multiple frequency ranges, as shown in FIGS. 9-12.

Rather than representing a raw audio signal, each of the drawings of FIGS. 9-12 shows a bar graph representing the maximum amplitude value reached within each frequency range by a raw audio signal. Similar to the diagrams in FIGS. 4-7, the diagrams in FIGS. 9-12 represent the frequency vs. amplitude characteristics of an audio signal, divided into the three different frequency ranges $R_1$, $R_2$, and $R_3$. The horizontal axis of the diagrams represents the frequency in kilohertz (kHz), while the vertical axis of the diagrams represents the amplitude (in decibels) of the audio signal. The vertical axis also shows a single threshold value $T_1$.

In certain examples, the defined frequency ranges in FIGS. 9-12 may correspond to those discussed for the example in FIGS. 4-7, with a first frequency range $R_1$ (such as, but not limited to the range of 0 to 5 kHz), a second frequency range (such as, but not limited to the range of above 5 kHz to 10 kHz), and a third frequency range (such as, but not limited to the range of above 10 kHz to 15 kHz). In other examples, the frequency ranges may be different from those discussed for examples in FIGS. 4-7. Alternatively, other examples may include no more than two frequency ranges, or may include more than three frequency ranges. In some examples, one (or more) of the defined frequency ranges may partially overlap one or two adjacent frequency ranges.

Figure 9:
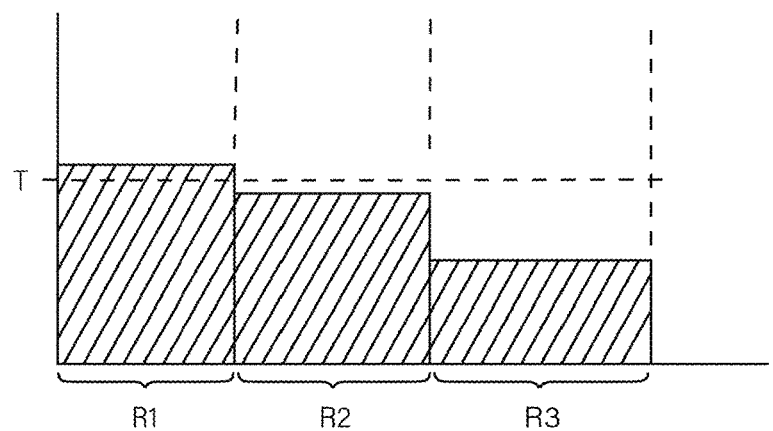
FIGS. 9-12 are generalized bar graphs of maximum amplitude versus frequency of example audio signals.

In the example in FIG. 9, a bar 500 shows that the amplitude of the raw audio signal exceeds the first amplitude threshold $T_1$ during the first frequency range $R_1$, but the bar 502 does not exceed the second amplitude threshold $T_2$ during the second frequency range $R_2$, and the bar 504 does not exceed the third amplitude threshold $T_3$ during the third frequency range $R_3$. In the example in FIG. 9, the processor 128 determines a first triggering event has occurred, in response to the amplitude of the audio signal having exceeded the first amplitude threshold $T_1$ during the first frequency range $R_1$.

Figure 10:
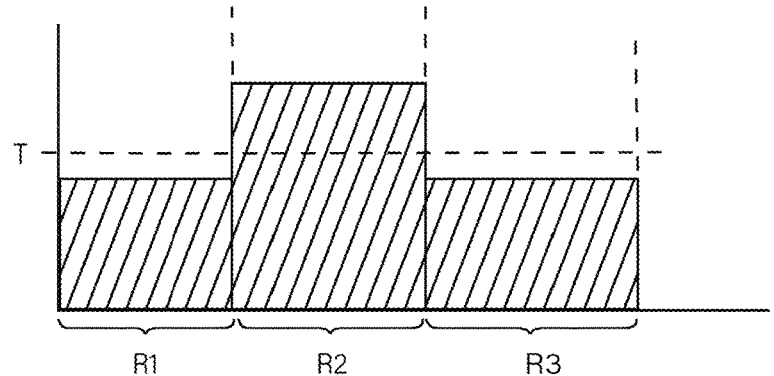

In the example in FIG. 10, a bar 502 shows that the amplitude of the raw audio signal exceeds the second amplitude threshold $T_2$ during the second frequency range $R_2$, but the bar 500 does not exceed the first amplitude threshold $T_1$ during the first frequency range $R_1$, and the bar 504 does not exceed the third amplitude threshold $T_3$ during the third frequency range $R_3$. In the example in FIG. 10, the processor 128 determines a second triggering event has occurred, in response to the amplitude of the audio signal having exceeded the second amplitude threshold $T_2$ during the second frequency range $R_2$.

Figure 11:
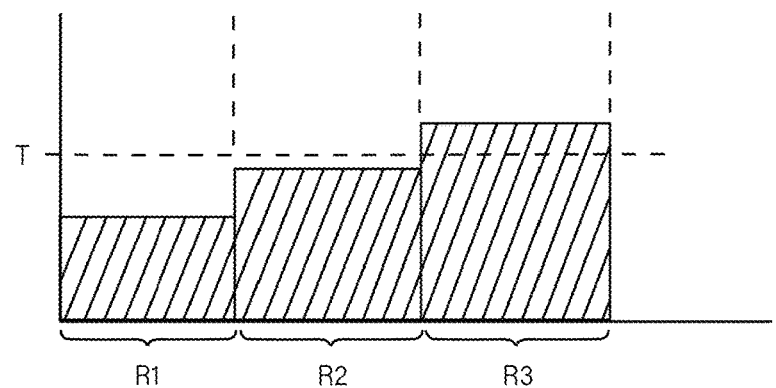
Figure 12:
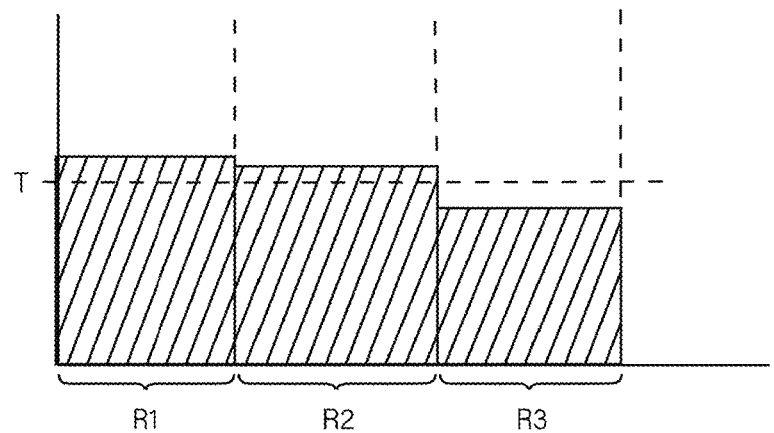

In the example in FIG. 11, a bar 504 shows that the amplitude of the raw audio signal exceeds the third amplitude threshold $T_3$ during the third frequency range $R_3$, but the bar 500 does not exceed the first amplitude threshold $T_1$ during the first frequency range $R_1$, and the bar 502 does not exceed the second amplitude threshold $T_2$ during the second frequency range $R_2$. In the example in FIG. 11, the processor 128 determines a third triggering event has occurred, in response to the amplitude of the audio signal having exceeded the third amplitude threshold $T_3$ during the third frequency range $R_3$.

In other examples in which the audio signal exceeds more than one of the thresholds $T_1$, $T_2$, and $T_3$ in their associated frequency ranges, the processor 128 may be configured to determine more than one of the triggering events. For example, in FIG. 12, the bars 500, 502 and 504 show that the amplitude of the audio signal exceeds the first amplitude threshold $T_1$ during the first frequency range $R_1$ and also exceeds the second amplitude threshold $T_2$ during the second frequency range $R_2$, but does not exceed the third amplitude threshold $T_3$ during the third frequency range $R_3$. In the example in FIG. 12, the processor 128 determines a first triggering event and a second triggering event has occurred.

Alternatively or in addition to the above processing examples, the processor 128 may be configured to include analytics capabilities for identifying triggering events based on groups or types of sounds and different criteria associated with each different group or type of sounds. In particular examples, the processor 128 is configured to identify different types of sounds from the audio signal provided by the microphone 104. In certain examples, the processor 128 may be configured or operate with conventional software that provides sound-recognition functions, such as, but not limited to TensorFlow™ Audio Recognition software, or the like. In other examples, the processor 128 is configured with customized sound recognition software or other suitable sound-recognition functions. An example of a list or library of individual sounds that may be recognized by the processor 128 configured with such audio recognition software is shown in the accompanying Appendix.

In addition to providing sound-recognition functions to recognize individual sounds within a library, the processor 128 may be further configured to categorize or group different individual recognized sounds within a defined set of sound categories. The device analytics software may group (or recognize) different sounds by category of sound (e.g., shots or explosions category, human yell or scream category, breaking or shattering materials category, alarms and sirens category, animal sounds category, automobile/vehicle sounds category, musical instrument or music category, lawn mower, door bell, etc.). Thus, for example, an ALARM category of sounds may include sounds of various vehicle sirens, emergency services sirens, smoke alarms, car alarms, or other sirens or alarms. An ANIMAL sound category may include sounds of various types of barking dogs, repetitive scratching or sniffing sounds, or other recognizable animal-made sounds. A VEHICLE sound category may include sounds of various types of vehicle engines, vehicle door opening or closing sounds, tire squealing sounds, or other recognizable vehicle sounds. In some examples, a human healthcare or biological sound category can include sounds corresponding to a human cough, sneeze, nose-blowing, breathing, stomach rumble or other sound associated with a human biological condition. Each category includes two or more sounds that may be recognized by the sound-recognition functions of a conventional sound recognition software or customized sound recognition software. In certain examples, categories are defined for multiple purpose use in a variety of monitoring contexts or popular audio monitoring contexts. In those examples, the defined group of sound categories may include, but are not limited to the above-noted categories. In other examples, one or more of those or other groups or categories may be defined for a particular context of use, where there is a desire to monitor an environment for one or more other categories or groups of sounds.

In particular examples, each of the defined group or category of sound may be associated with a respective one of a plurality of frequency ranges (such as, but not limited to the first, second and third frequency ranges described with reference to FIGS. 4-7). For example, a group of sounds corresponding to human yells, screams, raised voices over a period of time may be associated with the first frequency range. Similarly, a group of sounds corresponding to breaking or shattering glass or other breaking or shattering of other materials may be associated with the second frequency range. Also, a group of sounds representing gun shots and explosions may be associated with the third frequency range.

In further examples, one or more of those groups of sounds (or other groups of sounds) may be associated with multiple amplitude thresholds in multiple frequency ranges. In those examples, each different group of sounds may be associated with a respective different combination of amplitude thresholds in two or more of the frequency ranges. Accordingly, a group of sounds corresponding to human yells, screams, raised voices over a period of time may be associated with one or more thresholds in the first frequency range and one or more further thresholds in the second frequency range or one or more further thresholds in the third frequency range. Similarly, a group of sounds corresponding to breaking or shattering glass or other breaking or shattering of other materials may be associated with one or more thresholds in the second frequency range and one or more further thresholds in the first frequency range or one or more further thresholds in the third frequency range. Also, a group of sounds corresponding to gun shots and explosions may be associated with one or more thresholds in the third frequency range and one or more further thresholds in the second frequency range or one or more further thresholds in the first frequency range. In other examples, those or other groups of sounds may be associated with other suitable thresholds and frequency ranges.

In particular examples, the memory 129 is configured with data corresponding to predetermined thresholds and frequency ranges associated with the defined groups of sounds. Accordingly, the processor may determine thresholds and frequency ranges associated with the defined groups of sound, based on data stored in the memory 129. In certain examples, the processor 128 also includes or is configured with artificial intelligence or machine learning capabilities for determining or improving thresholds and frequency ranges to associate with each category or group of sound.

In certain examples of the processing, a different (identifiably different) category signal is associated with each of the different respective categories or groups of sound. Accordingly, the different category signals can represent different triggering events, and can be interpreted by the security system as being associated with different respective triggering events. In particular examples, the processor 128 (or the security system 204) may be configured to provide a response based on the category (or a combination of the category and the above-described triggering event or signal) determined by the processor 128.

Accordingly, a different response may be provided for each different category or group of sound determined by the processor 128 or the security system 204 (or for each different combination of a category or group of sound and at least one triggering event or signal). A first category signal representing human yells, screams, raised voices over a period of time may cause the processor 128 or the security system 204 (or personnel associated with the security system 204) to send a signal or other message to notify or send security personnel trained for human de-escalation techniques, medical personnel to a site associated with the location of the device 100. A second category signal representing breaking or shattering glass or other breaking or shattering of other materials may cause the processor 128 or the security system 204 (or personnel associated with the security system 204) to send a signal or other message to notify or send security personnel trained or armed for addressing possible break-ins to a site associated with the location of the device 100. A third category signal representing a gun shots or explosions may cause the processor 128 or the security system 204 (or personnel associated with the security system 204) to send a signal or other message to notify or send security personnel trained for armed response, medical personnel, or fire response personnel to a site associated with the location of the device 100. In other examples, other types of responses may be associated with the above-noted or other categories of sound determined by the processor 128 from the audio signal 300. In the above examples, the processor 128 or the security system 204 may be configured to provide a different, tailored response, based on each different triggering signal, or each different category (or each different combination of triggering signal and category) determined by or received from the processor 128, from among the first, second and third triggering signals.

Figure 13:
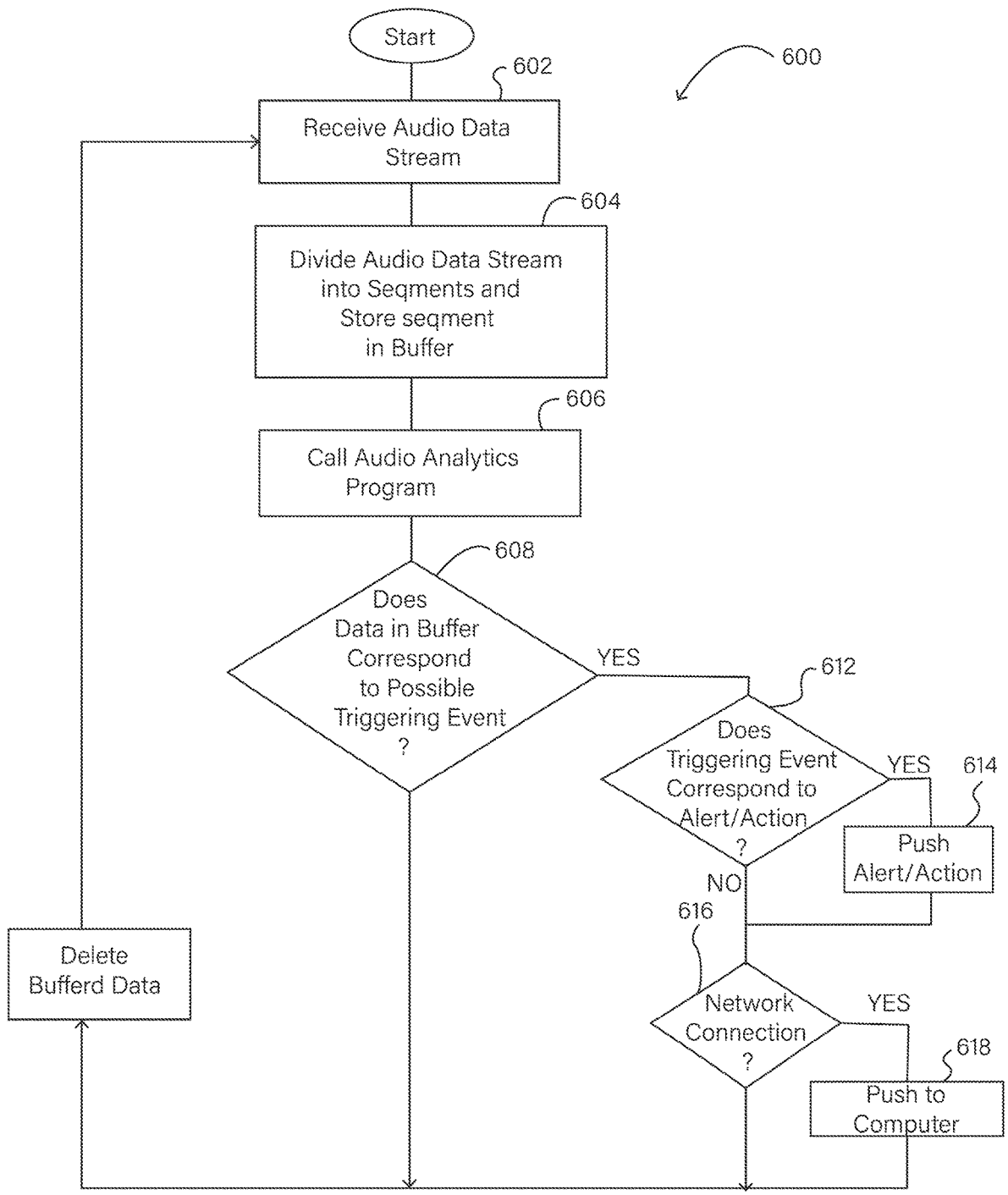
FIG. 13 is a flow chart of another generalized process carried out by the microphone-speaker device of FIG. 1.

The processor 128 may be configured to analyze audio signals in any suitable manner including, but not limited to the example process 600 represented by the flow chart of FIG. 13. The processor 128, once started, may be configured to control the system to receive (at block 602 in FIG. 13) audio signal data from the microphone 104.

The processor 128 may be configured to create and store (at block 604 in FIG. 13) one or more raw audio data files of a defined length, from the audio signal provided by the microphone 104. In certain examples, 1-second raw audio data files (or audio data files of any other suitable length) are created from the audio signal provided by the microphone 104. The processor 128 may include or operate with a Linux™ audio sound driver (or any other suitable audio driver) to divide an audio stream from the microphone 104 into discreet audio files of a desired length. Each audio file is stored in a buffer for analysis.

Upon the buffer being populated with an audio file, the processor 128 is alerted and calls or accesses (at block 606 in FIG. 13) an audio analysis program or system such as, but not limited to Tensorflow™. In some examples, the processor 128 may include or operate with an event listener that monitors the state of the buffer and alerts the processor 128 to start the audio analysis program, when a raw audio data file is added to the buffer. In some examples, the processor 128 may arrange the buffered audio data into an array or pattern suitable for analysis by an audio analysis program. A block of buffer memory segments and stores each respective audio file in raw format, and each raw file is processed through the audio analysis program.

The audio analysis program is employed (at block 608 in FIG. 13) to determine whether the raw audio data file in the buffer corresponds to a possible triggering event (such as, but not limited to a possible threat event). In some examples, the analysis may include a comparison of the array or pattern of buffered audio data with one or more pre-stored or predefined arrays or patterns that are known to correspond to possible triggering events. The processor 128 may be configured to identify a possible triggering event when the buffered audio data matches (or sufficiently closely matches) a pre-stored or predetermined pattern corresponding to a triggering event.

If the analytics does not determine a possible triggering event from the buffered audio data (i.e., NO at block 608), then the buffered data is deleted (at block 610 in FIG. 13). However, if the analytics determines that the buffered audio data corresponds to a possible triggering event (YES at block 608), then the process 600 proceeds to determine (at block 612 in FIG. 13) whether the possible triggering event corresponds to a particular alert or action to be carried out.

For example, the processor may access the memory 129 or other database, electronic data memory or data storage facility that stores data identifying one or more (or a plurality of) particular alerts or actions (or both) that correspond to one or more (or a plurality of) respective possible triggering events. By comparing the possible triggering event determined from the buffered audio data with data in the database, electronic data memory or other data storage facility, the processor may determine whether or not the possible triggering events corresponds to one or more particular alerts or actions.

If the process determines that the possible triggering event determined from the buffered audio data does correspond to a particular alert or action (YES at block 612), then the process proceeds to push or provide the particular alert, or take the particular action (at block 614 in FIG. 13) that corresponds to the possible triggering event. Such alerts or actions may include, but are not limited to, one or more of activating an audible or visible alarm or alert message, or transmitting an alarm or alert message by computer network, wireless communication network, radio link, telephone line, or other suitable mode of communication. Other alerts or actions may include, but are not limited to one or more of activating electronic security systems, activating electronic door or window locks, activating sprinkler or other fire abatement systems, playing a stored audio file in a non-volatile memory of the electronic system 102 from the speaker 106 where each type of event can be configured to play a unique audio file, capturing and storing one or more audio files for a defined amount of time (such as, but not limited to a time period in the range of 1-60 seconds) before and after the time the event was detected, or the like.

In certain examples, providing the particular alert or action includes changing the state of one or more output ports 100 of the electronic system 102 for a defined duration of time, where each output port can be connected to an input port (or activation input of) the electronic security system, the electronic door or window locks, the sprinkler or other fire abatement systems, an audio recording system, warning lights, sirens or other visible or audible alert or message device, or the like. In some examples, providing the alert or action may include sending one or more messages of meta data via HTTP or TCP protocols (or both protocols) to a compatible receiving IP address, where the meta data includes information regarding the triggering event such as, but is not limited to, a type of event, a date or time of the event, one or more fields of user configurable meta data to allow a user to provide information such as a location, a priority level, or the like.

After the alert or action is provided (at block 614 in FIG. 13), or in the event that the process does not determine that the possible triggering event corresponds to a particular alert or action (NO at block 612), then the process 600 proceeds to determine (at block 616 in FIG. 13) whether a suitable network connection (such as, but not limited to a WSS connection) is available. If a suitable network connection exists (YES at block 616), then the alert or action message may be communicated (at block 618 in FIG. 13) to a designated computer or computers such as, but not limited to, one or more computers at a central station or security station. Personnel at the central station or security station may be alerted by the alert or action message and may take appropriate action, based on the particular possible triggering event.

After the alert or action message is communicated (at block 618 in FIG. 13), or in the event that the process does not determine that the network connection is available (NO at block 616), then the process 600 proceeds to delete buffered data (at block 610 in FIG. 13). After deletion of the buffered data (at block 610), the process 600 may determine (at block 620 in FIG. 13) whether any further audio data is to be analyzed. If not (NO at block 620), the process 600 may end. If there is further audio data to be analyzed, then the process may return to block 602 for analyzing further audio input.

In certain examples, the smart microphone-speaker device 100 may be selectively configurable to accommodate a particular environment or facility, or to accommodate multiple types of environments or facilities. Thus, if the smart microphone-speaker device 100 is to be installed in a first environment or facility, the device 100 may be configured to provide an analysis of audio signal amplitude in multiple frequency ranges (such as $R_1$, $R_2$ and $R_3$) based on one or more (or multiple) threshold values (such as $T_1$, $T_2$ and $T_3$) as discussed above. Alternatively, if the smart microphone-speaker device 100 is to be installed in a second environment or facility, the device 100 may be configured to provide an analysis of audio signal based on groups or types of sounds and different criteria associated with each different group or type of sounds, such as by dividing the audio input into raw audio data files (such as, but not limited to 1-second raw audio data files) and applying an audio analysis program to each data file. If the smart microphone-speaker device 100 is to be installed in a second environment or facility, the device 100 may be configured to provide each of those audio analysis processes. The particular process or combination of processes may be selected to best accommodate a particular environment or facility in which the device 100 is to be installed.

In certain examples, the device 100 may be configured to provide an analysis of audio signal amplitude in multiple frequency ranges (such as $R_1$, $R_2$ and $R_3$) based on one or more (or multiple) threshold values (such as $T_1$, $T_2$ and $T_3$) as described above. If that process identifies one or more possible triggering events, then the device 100 proceeds to provide an analysis of audio signal based on groups or types of sounds and different criteria associated with each different group or type of sounds by dividing the audio input into raw audio data files (such as, but not limited to 1-second raw audio data files) and applying an audio analysis program to each data file as described above. Then the process may identify and provide an alert, action or action message based on the outcome of the audio analysis program, as described above. Accordingly, the smart microphone-speaker device 100 may be configured in various ways to implement one or more processes on the audio signal from the microphone 104, to accommodate various different installation environments or facilities.

The microphone 104 of the smart microphone-speaker device 100 may be an omnidirectional microphone that can capture sound from any direction. In other examples, the microphone 104 may be a unidirectional microphone that can capture sound from a predefined direction, or may be a microphone of any other polarization pattern. In some examples, the microphone 120 may have a selected frequency response characteristic suitable for the monitoring environment. In some examples, the microphone 104 may represent a plurality of microphones.

In certain examples, the microphone 104 is supported on a mounting structure 105 on or in the housing defined by the speaker grill 108 and the cover member 110. In particular examples, the mounting structure 105 and the microphone 104 are mounted on the speaker grill, within the diameter defined by the speaker cone of the speaker 106 and in some examples, may fit within and be partially surrounded by the cone of the speaker. In that manner, the mounting structure 105 and the microphone 104 do not require additional space.

In some arrangements, the speaker grill 108 has an opening (or a plurality of openings) aligned with the microphone 104. Audio sound may pass through the openings to the microphone 104. In some examples, the microphone 104 may supported by the microphone mounting structure 105. The microphone mounting device 105 may include body having an annular lip, a grommet, an O-ring, or another structure having a recess or channel therein, into which audio sound in the external vicinity of the smart microphone-speaker device 100.

In particular examples, the microphone mounting structure 105 includes a generally cylindrical, annular member with a central channel and a first end having a rounded, toroidal shape or a semi-toroidal shape. The body of the microphone mounting structure 105 may be made from any suitable material having sufficient rigidity to hold its shape, but some elastic resiliency to affect characteristics of sound, such as, but not limited to a silicon rubber, or other plastic.

In other examples, the microphone mounting structure 105 may be made from metal, ceramic, glass, combinations thereof, or the like. In certain examples, the microphone mounting structure 105 may include a toroidal, ring-shaped grommet as described in Applicant's U.S. Pat. No. 10,091, 569 (with reference to grommet 220 in that patent). In other examples, the microphone mounting structure 105 may have other suitable configurations.

As shown in the example of FIG. 2, the microphone mounting structure 105 may be attached to the speaker grill 108, in an orientation in which the rounded end is facing the speaker grill 108. The rounded end of the mounting structure 105 may be attached to the speaker grill 108 by any suitable connection mechanism such as, but not limited to adhesive, welding, thermal bonding, clamps, other fasteners or combinations thereof. The microphone 104 is attached on the other end of the microphone mounting structure 105 or within the central channel of the microphone mounting structure 105. The channel in the microphone mounting structure 105 has a depth into which audio sound may enter from the external vicinity of the smart microphone-speaker device 100. The microphone 104 may be aligned with the channel to capture audio sound through the channel.

In particular, the shape and size of the cross section of the rounded end and the channel of the microphone mounting structure 105 can affect the manner in which the sound from the exterior of the smart microphone-speaker device 100 is propagated through the channel to the microphone 104. Thus, the shape of the cross section of the microphone mounting structure 105 and the width of the microphone mounting structure 105 can be designed differently based on the characteristics of sound that the microphone 104 is intended to capture.

Furthermore, the dimensions and shapes of the microphone mounting structure 105 in which the microphone 104 is recessed may also be selected at the point of manufacture. Because one or more (or all) of the microphone frequency characteristics, and the microphone depth within the microphone mounting structure 105 may be selected and set at the point of manufacture, calibration of sensitive audio analytics software (e.g., at the motherboard 102a) to the microphone 104 can be carried out at the factory with improved accuracy, as compared to audio systems in which a type of microphone as well as a type and a length of connection may be selected by the end user or may otherwise vary from device-to-device or for different use environments.

The security system 204 may be a computing system capable of receiving, storing, analyzing, and/or displaying the audio data signals (outputted by the microphone 104) and the analytic results (determined by the processor 128 of the motherboard 102a). The security system 204 may include any suitable computing device such as but not limited to, a desktop computer, a server, a smart phone, a mobile device, a tablet, a laptop, a personal digital assistant, a wearable device, and the like, configured or otherwise programmed to carry out functions as described herein. The security system 204 may include one or more of a processor, a memory, a network device (to connect to the network 200), a display device (e.g., a screen), and one or more input/output devices (e.g., a touch screen, microphone, speaker, keyboard, and the like) for receiving user input. In some arrangements, the security system 204 may be located (e.g., in another room relative to the smart microphone-speaker device 100, at a remote location, at a data or security management facility, and the like), and need not be within the local vicinity of the smart microphone-speaker device 100. In other arrangements, the security system 204 may be located within the local vicinity of the smart microphone-speaker device 100.

In particular examples, the processor 128 on the motherboard 102a may be implemented with a general-purpose processor. In particular examples, the processor 128 may be a conventional, general-purpose, and programmable processor (or part of a general purpose processing circuit board system used as the motherboard 102a). In such examples, the motherboard 102a may be a conventional, general purpose, programmable processor board available (e.g., a commercially available board manufactured by a suitable manufacturer). The ability to employ an available, conventional general purpose processor board as the motherboard 102a can reduce the manufacturing complexity and cost of the smart microphone-speaker device 100. In other examples, the motherboard 102a may be a dedicated circuit, configured specifically for the smart microphone-speaker device 100. In particular arrangements, the processor 128 may be implemented with an Application Specific Integrated Circuit (ASIC), one or more Field Programmable Gate Arrays (FPGAs), a Digital Signal Processor (DSP), a group of processing components, or other suitable electronic processing components.

The memory 129 may be any suitable electronic memory device or devices (such as, but not limited to one or more, or a combination of non-transitory computer-readable or processor-readable storage media as described below), that stores electronic data and/or computer code for facilitating at least some (or all) of the various processes described herein. The memory 129 includes tangible, non-transient volatile memory, or non-volatile memory. The memory 129 stores programming logic that, when executed by the processor 128, controls the operations of the motherboard 102a. Accordingly, while the processor 128 may (in some examples) be a general purpose processor, the processor 128 may be configured with programming logic and data from the memory 129, to perform functions and operations as described herein.

In some arrangements, audio analytics software for configuring the processor 128 to perform audio analytics as described herein may be stored in the memory 129 (or may be provided by hardware, firmware, and/or the like on the daughterboard 102b, on the motherboard 102a, or external to the motherboard and the daughterboard but connected thereto). In particular examples, the processor 128 can be enabled by the audio analytics software to output analytic results (e.g., signals) to the data port 126 on the motherboard 102a, to be relayed to the daughterboard 102b, which may forward the analytic results to the security system 204. For example, the audio analytics software can provide the processor 128 with the ability to output a signal (through the data port 126) indicating that one or more particular or pre-defined sound events have been detected.

In further implementations, additional software, firmware, and/or hardware may be included to provide the processor 128 with the ability to process and analyze data from other external devices (external to the smart microphone-speaker device 100) and/or control such other external devices. Examples of such external devices include but are not limited to, local cameras, additional external microphones, speakers, and the like, that may be connected to the motherboard 102a through suitable interfaces (e.g., data ports) or connection pins.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes CD, laser disc, optical disc, digital versatile disc DVD, floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A microphone-speaker device, comprising:
    a speaker;
    a microphone configured to capture sound and output an audio data signal;
    a housing configured to contain the microphone and the speaker; and
    an electronic circuit including audio electronics coupled to the speaker, an Ethernet interface configured to connect the electronic circuit for communication with a security system through an Ethernet connection, a power extractor for extracting power from the Ethernet connection for powering the electronic circuit and the microphone, and processing electronics configured to process the audio data signal from the microphone;
    wherein the processing electronics is configured to monitor multiple different frequency ranges of the audio data signal for a signal characteristic crossing at least one threshold associated with one or more of the different frequency ranges.

2. The microphone-speaker device of claim 1, wherein the signal characteristic monitored comprises signal amplitude.

3. The microphone-speaker device of claim 1, wherein a different respective threshold value is associated with each different respective frequency range.

4. The microphone-speaker device of claim 1, wherein the multiple different frequency ranges comprises a first frequency range of from 0 kHz to 5 kHz, and a second frequency range of greater than 5 kHz.

5. The microphone-speaker device of claim 4, wherein the second frequency range is from above 5 kHz to 10 kHz, and the multiple different frequency ranges further comprises a third frequency range of greater than 10 kHz.

6. The microphone-speaker device of claim 1, wherein the processing electronics is configured to provide a first signal in response to detecting the signal characteristic crossing a first one of the at least one thresholds within a first range of frequencies of the audio signal, and to provide a second signal in response to detecting the signal characteristic crossing a second one of the at least one thresholds within a second range of frequencies of the audio signal.

7. The microphone-speaker device of claim 6, wherein the processing electronics is further configured to provide a third signal in response to detecting the signal characteristic crossing a third one of the at least one thresholds within a third range of frequencies of the audio signal.

8. The microphone-speaker device of claim 1, wherein the processing electronics is further configured to: analyze the audio signal to identify sound received by the microphone from among a plurality of different predefined sounds, group the predefined sounds within a plurality of predefined categories, and identify at least one category associated with the audio signal.

9. The microphone-speaker device of claim 8, wherein the processing electronics is configured to provide a signal corresponding to identify at least one category associated with the audio signal.

10. The microphone-speaker device of claim 1, wherein the processing electronics is further configured to: analyze the audio signal to identify sound received by the microphone from among a plurality of different predefined sounds, group the predefined sounds within a plurality of predefined categories, and identify at least one category associated with the audio signal.

11. The microphone-speaker device of claim 10, wherein the processing electronics is configured to provide a signal corresponding to identify at least one category associated with the audio signal.

12. The microphone-speaker device of claim 1, wherein the electronic circuit comprises a first circuit board configured to perform audio analytics on the sound data signals; and a second circuit board configured to extract power for powering the first circuit board.

13. A microphone-speaker device, comprising:
    a speaker;
    a microphone configured to capture sound and output an audio data signal;
    a housing configured to contain the microphone and the speaker;
    an electronic circuit including audio electronics coupled to the speaker, an Ethernet interface configured to connect the electronic circuit for communication with a security system through an Ethernet connection, a power extractor for extracting power from the Ethernet connection for powering the electronic circuit and the microphone, and processing electronics configured to process the audio data signal from the microphone; and
    a microphone mounting structure comprising a cylindrical grommet having a rounded open end that opens to an inner channel in which the microphone is mounted, the rounded open end of the cylindrical grommet is attached to the housing;
    wherein the housing includes a speaker grill arranged to pass audio output from the speaker, and the rounded open end of the cylindrical grommet is attached to the speaker grill.

14. A microphone-speaker device, comprising:
    a speaker;
    a microphone configured to capture sound and output an audio data signal;

a housing configured to contain the microphone and the speaker; and an electronic circuit including audio electronics coupled to the speaker, an Ethernet interface configured to connect the electronic circuit for communication with a security system through an Ethernet connection, a power extractor for extracting power from the Ethernet connection for powering the electronic circuit and the microphone, and processing electronics configured to process the audio data signal from the microphone;

wherein the processing electronics is configured to:

divide the audio data signal into discrete segments and store at least one segment at a time in a buffer;

determine whether the audio data signal being stored in the buffer corresponds to a possible triggering event by employing an audio analytics program to analyze the segment of the audio data;

determine whether the possible triggering event corresponds to an alert or an action to be taken, upon determining that the audio data signal being stored in the buffer does correspond to a possible triggering event; and provide the alert or action upon determining that the possible triggering event corresponds to an alert or an action to be taken.

15. The microphone-speaker device of claim 14, further comprising accessing the audio analytics program in response to a segment of the audio data signal being stored in the buffer.

16. A microphone-speaker device, comprising:

a speaker;

a microphone configured to capture sound and output an audio data signal;

a housing configured to contain the microphone and the speaker; and an electronic circuit including audio electronics coupled to the speaker, an Ethernet interface configured to connect the electronic circuit for communication with a security system through an Ethernet connection, a power extractor for extracting power from the Ethernet connection for powering the electronic circuit and the microphone, and processing electronics configured to process the audio data signal from the microphone;

wherein the processing electronics is configured to:

monitor multiple different frequency ranges of the audio data signal for a signal characteristic crossing at least one threshold associated with one or more of the different frequency ranges; and to divide the audio data signal into discrete segments and store at least one segment at a time in a buffer;

determine whether the audio data signal being stored in the buffer corresponds to a possible triggering event by employing an audio analytics program to analyze the segment of the audio data; and determine whether the possible triggering event corresponds to an alert or an action to be taken, upon determining that the audio data signal being stored in the buffer does correspond to a possible triggering event.

17. A method of making a microphone-speaker device, comprising:

supporting a speaker and a microphone in a housing, the microphone configured to capture sound and output an audio data signal;

providing an electronic circuit including coupling audio electronics to the speaker, connecting an Ethernet interface to the electronic circuit for communication with a security system through an Ethernet connection, connecting a power extractor for extracting power from the Ethernet connection for powering the electronic circuit and the microphone, and configuring processing electronics to process the audio data signal from the microphone;

wherein configuring comprises configuring the processing electronics to monitor multiple different frequency ranges of the audio data signal for a signal characteristic crossing at least one threshold associated with one or more of the different frequency ranges.

18. The method of claim 17, wherein configuring further comprises configuring the processing electronics to: analyze the audio signal to identify sound received by the microphone from among a plurality of different predefined sounds, group the predefined sounds within a plurality of predefined categories, and identify at least one category associated with the audio signal.

19. A method of making a microphone-speaker device, comprising:

supporting a speaker and a microphone in a housing, the microphone configured to capture sound and output an audio data signal;

providing an electronic circuit including coupling audio electronics to the speaker, connecting an Ethernet interface to the electronic circuit for communication with a security system through an Ethernet connection, connecting a power extractor for extracting power from the Ethernet connection for powering the electronic circuit and the microphone, and configuring processing electronics to process the audio data signal from the microphone;

wherein configuring comprises configuring the processing electronics to:

divide the audio data signal into discrete segments and store at least one segment at a time in a buffer;

determine whether the audio data signal being stored in the buffer corresponds to a possible triggering event by employing an audio analytics program to analyze the segment of the audio data;

determine whether the possible triggering event corresponds to an alert or an action to be taken, upon determining that the audio data signal being stored in the buffer does correspond to a possible triggering event; and provide the alert or action upon determining that the possible triggering event corresponds to an alert or an action to be taken.

* * * * *